Aug. 14, 1945.   H. L. PENBERTHY   2,382,660
TREATMENT OF OPTICAL SURFACES
Filed April 27, 1943
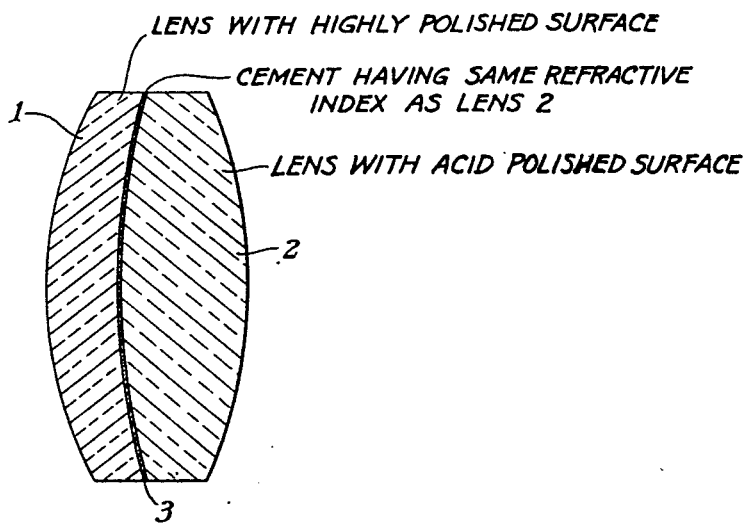
HARVEY LARRY PENBERTHY
INVENTOR
BY
ATTORNEY Patented Aug. 14, 1945

2,382,660

UNITED STATES PATENT OFFICE 2,382,660

TREATMENT OF OPTICAL SURFACES

Harvey Larry Penberthy, Rochester, N. Y., assignor to Eastman Kodak Company, Rochester, N. Y., a corporation of New Jersey Application April 27, 1943, Serial No. 484,775

5 Claims. (Cl. 88—57)

This invention relates to the treatment of optical surfaces and more particularly to the lessening of irregularities and the removal of fine particles of glass or other waste material remaining after grinding and even after polishing of the surfaces.

The grinding operation, even very fine grinding, leaves the surface of glass with many fine irregularities in its surface, such as protruding grains, fractures extending into the glass, and fine particles or wedges of glass forced into the fractures thus formed. It is customary, following the last and finest grinding, to polish the surfaces with materials having very fine grain, such as rouge, as distinguished from the larger particles of emery or carborundum used in grinding. This polishing wears down the irregularities, protruding particles, and glass splinters, and greatly increases the smoothness and specular reflecting properties, as distinguished from the rather dull or diffusely reflecting surface present after grinding. It has long been known that treatment with hydrofluoric acid after grinding cleared up the appearance of the ground surfaces very markedly, presumably largely by the dissolving of the glass splinters and the peaks of the protruding particles.

It has also been known that the fluorides produced by the action of the hydrofluoric acid were insoluble in that acid and tended to accumulate on the surface, and that they should be removed, as by the addition of sulfuric acid to the hydrofluoric acid.

I have found that certain advantages are obtained if perchloric acid is used to remove the waste products. The technique may comprise alternately dipping the article in hydrofluoric acid and rinsing it in perchloric acid, with observation of the results until the desired surface is obtained, or submitting it to a bath containing both acids. It is to be understood that the hydrofluoric acid, which is furnished commercially in a water solution at about 50% strength, may be used at that strength or be diluted to the desired strength. The perchloric acid may be used at ordinary commercial strength, that is, about 60%, or diluted if desired.

When the two acids are used in the same bath, the article may be repeated and alternately dipped into the acid and into a rinsing bath, remaining in each about a minute each time, and inspected at each rinsing until the desired finish is obtained. From five to fifteen such dippings would ordinarily take place. The hydrofluoric concentration is preferably less in the baths used at first than in the final baths.

For instance, the bath first used may be the following:

| | Parts |
|---|---|
| Hydrofluoric acid (50% strength) | 1 |
| Perchloric acid (60% strength) | 5 | and that used finally may be the following:

| | Parts |
|---|---|
| Hydrofluoric acid (50% strength) | 1 |
| Perchloric acid (60% strength) | 3 |

While it is to be understood that the strength of the baths is by no means critical, experience indicates that best results are obtained with a concentrated bath. The action of the concentrated solution is not so rapid as to make control difficult.

The use of perchloric acid to remove the fluorides or other waste products has obvious advantages over a mechanical method of brushing or rubbing in that no mechanism is required and the work may be inspected and controlled more easily and exactly.

Its use also has advantages over sulfuric acid in that there is not the violent reaction when the acid is diluted, with resultant sputtering. Also, the sulfuric acid attacks the fluorides with much more violent and rapid evolution of hydrogen fluoride, which is in large part lost as a gas, instead of being redissolved to re-form hydrofluoric acid. Since this gas is poisonous, this introduces an industrial hazard which is greatly lessened or avoided entirely when perchloric acid is used, since there is no such violent evolution of gas, and most of the hydrogen fluoride is redissolved and recovered.

Furthermore, sulfuric acid is preferably used at an elevated temperature which is not necessary with perchloric acid, since the process works very well at ordinary room temperatures.

It is usual to submit lens and prism surfaces to a series of grinding operations, beginning with coarse and ending with very fine abrasive particles followed by a polishing operation. Such surfaces, if treated as herein described following the usual fine grinding operation, may be at once cemented to other optical surfaces without the polishing operation.

It is to be understood that the resultant surface is not a diffusing surface, but so closely approximates an optical polished surface that when cemented to an optical polished surface of the same curvature, it functions like an optical polished surface. The cement should have, as nearly as possible, the same refractive index as the element which has been treated as herein described. Any remaining roughnesses will be filled in by the cement, and the effect will be that of two optically polished contacting surfaces.

Such a cemented doublet or objective may be used in optical instruments where an image is formed as distinguished from one where the light is diffused and no sharp image is formed. Both cemented surfaces may be treated in the manner described, but the resulting image, while sharp enough for many purposes, will not be as sharp as when only one surface has been treated and the other polished.

A specific example of glass and cement having substantially the same refractive index is LBC—1 glass, having an index for the D line of 1.541; and a Canadian balsam available on the market, having an index of 1.544. Another example is BSC—2 glass, having an index of 1.517, and a butyl-methacrylate cement having an index of 1.515. The difference in indices, to secure highly satisfactory results should not exceed .005, and for completely satisfactory results should be less than .003. The glasses mentioned are listed in Bausch and Lomb current catalogs.

In the accompanying drawing is shown an objective having a lens element 1, with a highly polished concave surface, to which is cemented a second lens element 2, the convex surface of which is acid polished to the same curvature. The two lens elements are joined by a cement 3 having the same index of refraction as lens 2.

This aspect of my invention is of use, whatever the form of "acid polishing," by which is meant treatment with hydrofluoric acid with or without another acid, this being a well known process. In any case, the cement has substantially the same refractive index as the ground and acid-polished surface.

Having thus described my invention, what I claim is:

1. The method of treating an optical glass surface that comprises bathing it in hydrofluoric acid to attack surface irregularities and removing the waste products thus formed with perchloric acid.

2. The method of treating a ground glass surface having irregularities and minute splinters of glass that comprises bathing it in dilute hydrofluoric acid to attack the surface irregularities and the splinters and then bathing it in perchloric acid to remove waste products formed by the action of the hydrofluoric acid upon the glass.

3. The method of treating a ground glass surface having irregularities and minute splinters of glass that comprises bathing it in a mixture of hydrofluoric and perchloric acids.

4. The method of making a cemented doublet capable of giving a sharp image that includes the steps of fine grinding one surface of a glass element to the desired curvature, treating such fine ground surface with hydrofluoric acid and perchloric acid until a clear, specularly reflecting surface is obtained, and then cementing such surface to another glass surface having the same curvature.

5. The method of making a cemented doublet capable of giving a sharp image that includes the steps of fine grinding one surface of a glass element to the desired curvature, treating such fine ground surface with hydrofluoric acid and perchloric acid until a clear, specularly reflecting surface is obtained, and then cementing such surface to another glass surface having the same curvature with a cement having the same refractive index as the first glass element.

HARVEY L. PENBERTHY.